Nov. 24, 1970
Y. PELENC ET AL
3,543,151
MAGNETO-OPTICAL APPARATUS FOR THE MEASUREMENT OF AND ELECTRICAL CURRENT FLOWING IN AN AERIAL HIGH-VOLTAGE CONDUCTOR
Filed Jan. 8, 1968
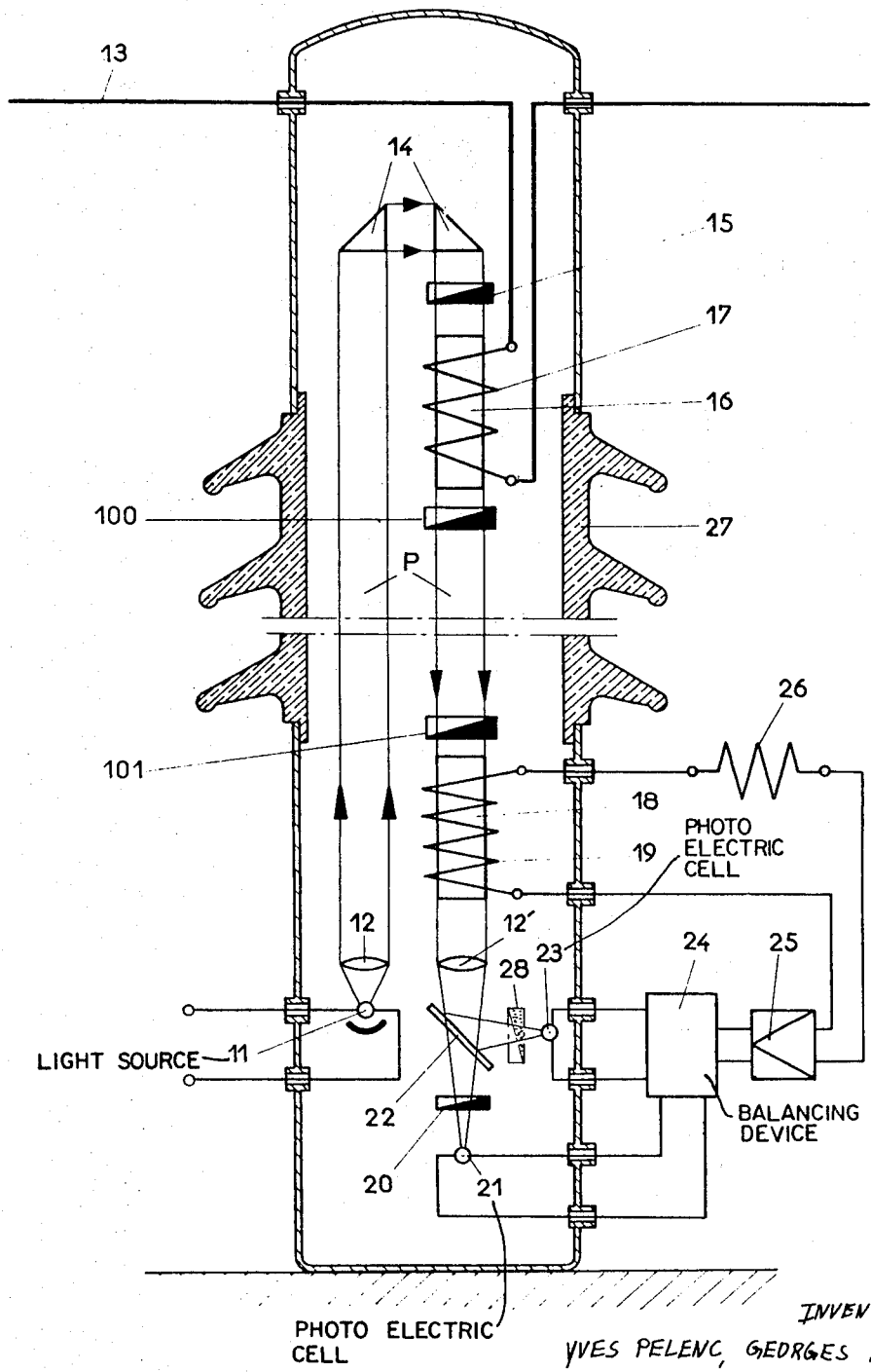
INVENTORS
YVES PELENC, GEORGES BERNARD,
By Stevens, Davis, Miller & Mosher
ATTORNEYS United States Patent Office 3,543,151
Patented Nov. 24, 1970

3,543,151
MAGNETO-OPTICAL APPARATUS FOR THE MEASUREMENT OF AN ELECTRICAL CURRENT FLOWING IN AN AERIAL HIGH-VOLTAGE CONDUCTOR
Yves Pelenc, La Tronche, and Georges Bernard, Grenoble, France, assignors to Merlin Gerin, Societe Anonyme, Grenoble, France
Filed Jan. 8, 1968, Ser. No. 696,295
Claims priority, application France, Jan. 18, 1967, 91,684
Int. Cl. G01r 19/00; G02f 1/22
U.S. Cl. 324—96                                    3 Claims

ABSTRACT OF THE DISCLOSURE

A current measurement device comprising a magneto-optical sensing device located in the vicinity of a high-voltage conductor carrying the current to be measured and near ground a magneto-optical measuring device, a light beam transmitting the information from said sensing to said measuring device, the light intensity of this light beam varying as a direct function of the magnitude of the current flowing in the high-voltage conductor.

BACKGROUND OF THE INVENTION

Field of invention

The present invention relates to devices for the measurement of an electrical current flowing in an aerial high-voltage conductor, such devices including in the high voltage zone, in the vicinity of the conductor, a first Faraday effect device to produce the angular rotation of the plane of the polarization of a flux of polarized light under the influence of a magnetic field created by the current to be measured, and including, in the low voltage zone, away from the conductor in the vicinity of ground, a second Faraday effect device to indirectly measure said angular rotation.

DESCRIPTION OF THE PRIOR ART

Such a device, including the latest improvements, is described in the present inventors' U.S. Pat. No. 3,419,-802 in which a polarized light beam conveys the measurement information from said first Faraday effect device to said second Faraday effect device, the rotation of the plane of polarization of said beam varying as a direct function of the magnetic field created by the current to be measured.

The present inventors have now ascertained that in the device of the prior art the polarization is not perfectly maintained in the case of the measurement of very high voltages where the distance from the first Faraday effect device to the second Faraday effect device is extensive.

SUMMARY OF THE INVENTION

The object of the present invention is to remedy to such a drawback by having an analyzer located in the high voltage zone to intercept the light beam immediately after passing through the first Faraday effect device, a polarizer having preferably the same orientation as the analyzer being located in the low voltage zone in the light flux immediately before it reaches the second Faraday effect device.

The analyzer converts the amount of the angular rotation of the plane of polarization of the polarized light beam into a proportionate light intensity, the polarizer securing a perfect polarization of the light beam to allow a measurement of said light intensity by means of said second Faraday effect device.

BRIEF DESCRIPTION OF THE DRAWING

An embodiment of the invention will be hereinafter given by way of example, with reference to the accompanying drawing showing diagrammatically the incorporation of the present invention in the device described in the above-mentioned U.S. Pat. No. 3,419,802.

DESCRIPTION OF A PREFERRED EMBODIMENT

A light source 11 emits a visible, infrared or ultraviolet veam. The source is preferably located in the vicinity of ground where the measurement is made at a potential equal to, or near that of ground. The transmitted beam P passes through an optical system 12 towards a high-voltage conductor 13, the current of which is to be measured. A system of prisms 14 deflects the beam towards a polarizer 15 which may also be mounted between the lens 12 and the prisms 14. The polarized beam then passes through a transparent magneto-optically active body 16 located in an axial magnetic field created by a coil 17 carrying the current to be measured $i_1$, flowing in the conductor 13, or a proportional current. Under the action of the magnetic field, the plane of polarization undergoes, inside the body 16, which has a high Verdet's constant and which may be, for example, a heavy flint, an angular rotation which is proportional to the intensity of the magnetic field produced by the current which is proportional to or equal to that flowing in the conductor 13. This effect is known as magnetic rotary polarization or Faraday effect. The polarized light beam leaving the body 16 passes through an analyzer 100 so that the intensity of the light beam leaving the analyzer 100 varies as a direct function of said angular rotation and therefore of the current to be measured.

At a potential near ground, this rotation is measured by a compensating method. The beam coming from the magneto-optically active body 16 and the analyzer 100 passes successively through a polarizer 101 and a second magneto-optically active device 18 similar to the device 16, and situated in the magnetic field created by a current in the coil 19 whose axial direction is parallel to that of the light beam. The compensating method is based on the fact that, if the rotations produced by the two magneto-optically active devices and thus the light intensity variations resulting therefrom in the light beam are of equal proportion and in opposite directions, the beam is not affected by said variations and the current in the coil 19 is therefore proportional to the current flowing in the conductor 13. The operation of the whole system is analogous to the functioning of a conventional transformer. The light flux simulates the magnetic flux of an electro-magnetic transformer, the coil 17 presents the primary ampere-turns and the coil 19 the secondary ampere-turns. In operation, any difference, however small, between the fields produced by the primary and secondary ampere-turns of the coils 17 and 19, respectively, results in a slight rotation of the plane of polarization of the beam emerging from the magneto-optical device 18, in one direction or the other relative to the initial orientation. This rotation is converted into a variation of the intensity of the light beam in traversing an analyzer 20. The first Faraday effect device 16, including the analyzer 100, disposed in the vicinity of the conductor 13, modulates the intensity of the light beam substantially proportional to the current $i_1$ to be measured and the second Faraday effect device 18 including the polarizer 101 and the analyzer 20 compensate this light intensity modulation so that the intensity of the light beam emerging from the analyzer 20 is maintained constant. The analyzer 20 is followed by a photo-electric cell 21, an optical system focussing the beam. A semi-reflecting or light dividing plate 22 deflects preferably a part of the beam towards a second photo-electric cell 23. The difference between the signals emitted by the cells 21 and 23, illuminated, respectively, by the partial beams transmitted and reflected by the plate, is elaborated in balancing device 24 which supplies a secondary signal which is free from interferences with the light beam. This signal is electronically amplified in 25 and produces a current $i_2$ which supplies the coil 19 and an external load 26 which may be formed by the measuring apparatus, counters or relays. The operation is such that the amplifier 25 acts on the secondary current $i_2$ in such a way that the difference between the primary and secondary ampere-turns in the coils 17 and 19, respectively, always tends to become zero.

In order that the photo-electric detector always receives a signal which enables the amplifier 25 to be controlled, there must always exist under operation a small difference between the primary and secondary ampereturns of the coils 17 and 19, respectively. This small difference corresponds to the magnetizing ampere-turns of a conventional electro-magnetic transformer.

The optical assembly will be preferably located inside a protecting chamber whose center portion 27 is insulated.

Preferably, a second analyzer 28 will be located between the plate 22 and the cell 23, whereby the sensitivity can be doubled.

According to the present invention an analyzer 100 is disposed immediately after the transparent magnetooptically active device 16, 17, and a polarizer 101 having preferably the same orientation is disposed before the second transparent magneto-optically active device 18, 19.

What is claimed is:

1. A device for the measurement of an electrical current flowing in an aerial high voltage conductor of the type comprising a device for modulating the intensity of a polarized light beam and comprising, a first Faraday effect device disposed in the vicinity of said conductor and including a first magneto-optically active body disposed to be traversed by said polarized light beam, first electrically conducting mean excited by said current and creating a magnetic field in said first body to produce a rotation of the plane of polarization of said light beam and an analyzer disposed to be transversed by the light beam emerging from said first body, so that the intensity of the light beam leaving said analyzer varies as a direct function of the magnitude of said electrical current, a second Faraday effect device located in the vicinity of ground and comprising, a polarizer disposed to be traversed by the light beam emerging from said first Faraday effect device to produce a plane polarization of said light beam, a second magneto-optically active body traversed by the light beam leaving said polarizer, second electrically conducting means excited by a compensating current and creating a magnetic field in said second body to produce a compensating rotation of the plane of polarization of said light beam to compensate the light intensity variation produced by said first Faraday effect device, means including an electronic amplifier to produce said compensating current, a photo-electric device collecting the light flux of the beam emerging from said second Faraday effect device and electrically connected to said amplifier.

2. A device as set forth in claim 1, in which said analyzer and said polarizer have planes of transmission which are coplanar.

3. A device as set forth in claim 2 further comprising optical dividing means to divert a part of said light beam emerging from said second Faraday effect device, a second photo-electric device collecting the diverted light flux of said light beam reflected by said dividing means, an electronic balancing device, said first and second photoelectric devices being electrically connected in opposition and to said balancing device, the output of which being connected to said amplifier.

References Cited
UNITED STATES PATENTS

| | | | |
|---|---|---|---|
| 1,958,606 | 5/1934 | Birch-Field | 350—151 X |
| 3,324,393 | 6/1967 | Casey et al. | 324—96 |
| 3,419,802 | 12/1968 | Pelenc et al. | 324—96 |

GERARD R. STRECKER, Primary Examiner

U.S. Cl. X.R.

250—225; 350—151